July 9, 1940.  M. H. LOUGHRIDGE  2,206,907
DIFFERENTIAL MECHANISM
Filed Jan. 15, 1937  3 Sheets-Sheet 2

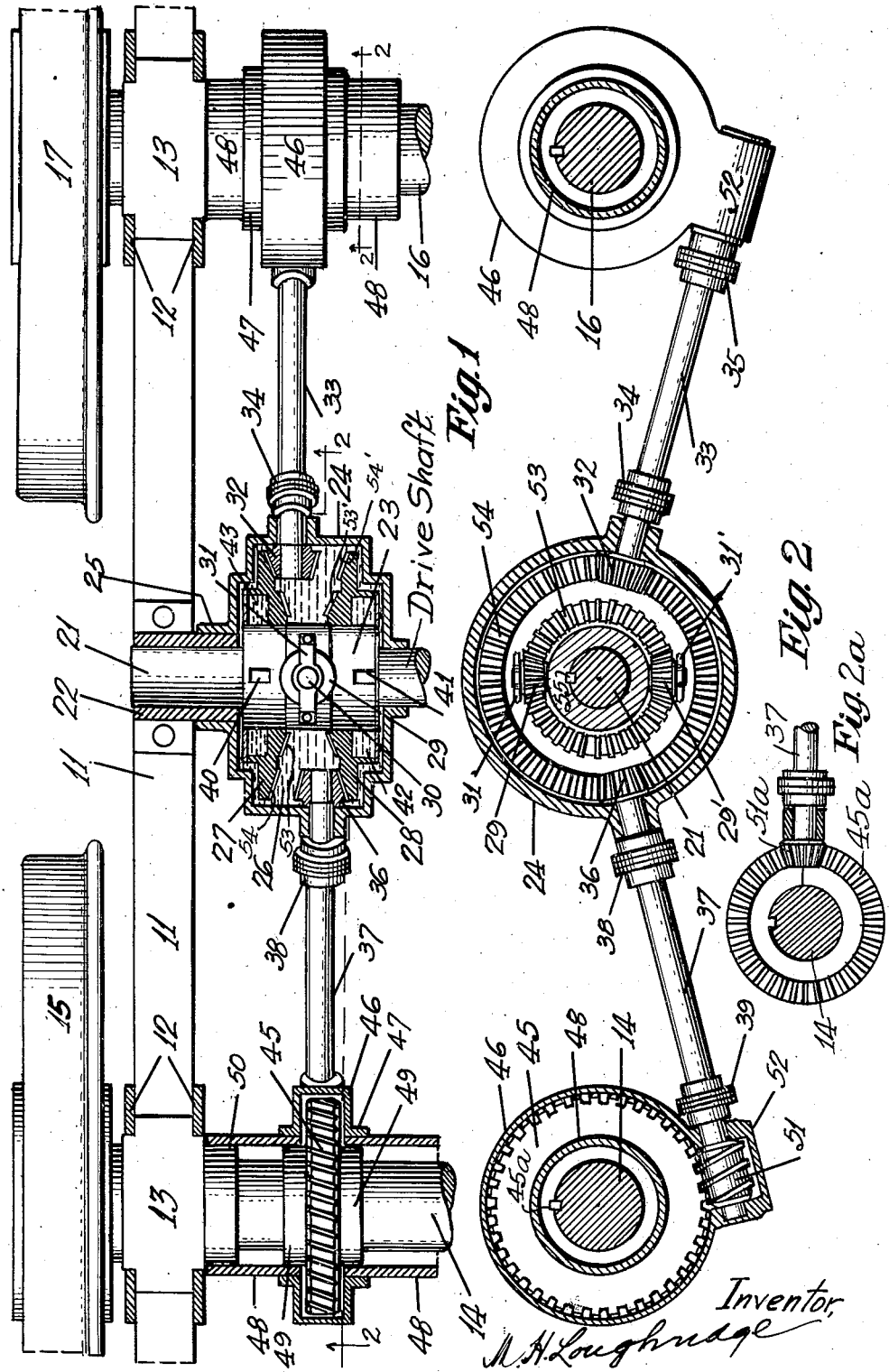

INVENTOR.
Matthew H. Loughridge

July 9, 1940.  M. H. LOUGHRIDGE  2,206,907
DIFFERENTIAL MECHANISM
Filed Jan. 15, 1937  3 Sheets-Sheet 3

INVENTOR.
Matthew H. Loughridge
BY
ATTORNEY.

Patented July 9, 1940

2,206,907

UNITED STATES PATENT OFFICE 2,206,907

DIFFERENTIAL MECHANISM

Matthew H. Loughridge, Bogota, N. J.

Application January 15, 1937, Serial No. 120,682

11 Claims. (Cl. 74—315)

This invention relates to differential mechanisms. It has for an object to provide an equalized drive for the driven wheels or axles of a vehicle or the like; to provide a limited differential in the vehicle drive so that when the difference in the driving torque between a pair of driven wheels exceeds a predetermined limit the drive is then equalized and to provide a mechanical differential mechanism in the drive of the vehicle with a hydraulic differential mechanism to modify the operation of the mechanical differential.

The details of the apparatus and its mode of operation for securing these and other objects of the invention are more fully described in the following specification, and illustrated in the accompanying drawings, selected to show one form of the invention and in which, Fig. 1 is a plan view of part of a railway truck, partly sectioned, showing the equalized drive for a pair of axles;

Fig. 2 is a side elevation, partly sectioned, of the mechanism shown in Fig. 1;

Fig. 2a is a detail showing an alternative form of drive for the running axles;

Figure 8:
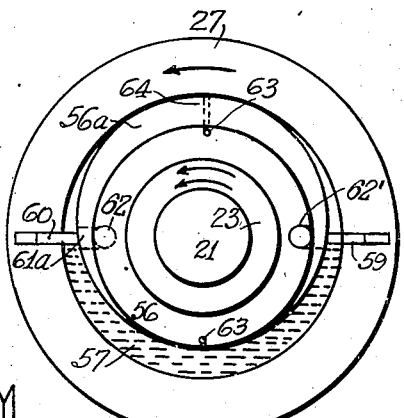
Figure 9:
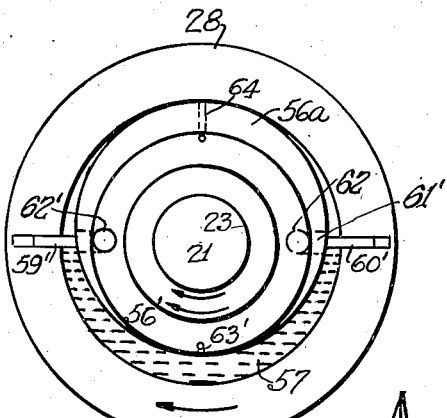
Figure 10:
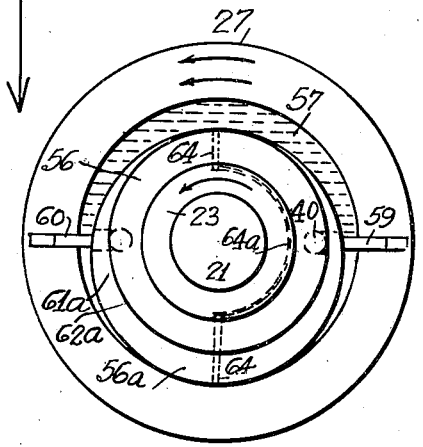
Figure 11:
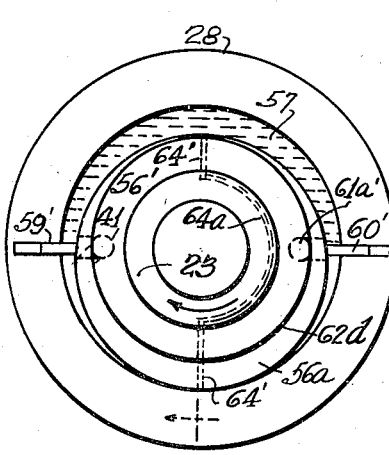
Figure 12:
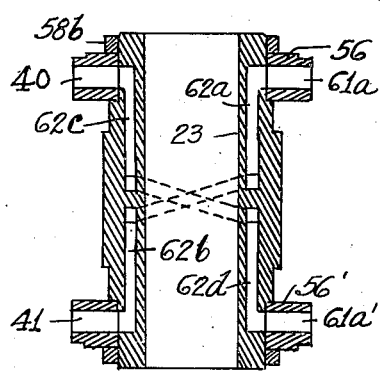

Figs. 8 and 9 show in diagram the opposing fluid pressures in a closed circuit system when the planetary member exceeds the speed of the gears; Figs. 10 and 11 are another diagram showing the fluid pressures when the gears exceed the speed of the planetary and Fig. 12 is a sectional view of a planetary for use with Figs. 10 and 11.

The equalized drive and limited differential

In order to obtain sufficient traction it is necessary to apply the drive to a plurality of running wheels and in order to drive under these conditions with running wheels that may not be of exactly the same diameter and also to insure better operation on curves and, further, to compensate for uneven wear on the wheel tread that is likely to develop with rubber tires, an equalized drive is used. This drive comprises a differential mechanism of the usual type having a planetary member connected with the drive shaft and having a pair of members geared to the planetary member with a floating connection, each of these members being connected with one of the axles of the running wheels. In this mechanism the drive is equalized between the axles of the running wheels so that one axle may rotate faster than the other while the torque remains equal.

In the usual type of differential mechanism the differential may be one hundred per cent, that is to say, if one of the driven axles loses its resistance, the entire drive is applied to this axle, while the other axle having normal resistance remains stationary. This is an undesirable condition, particularly for railroad cars operating on a railway track and particularly for cars having rubber tired wheels which may lose their adhesion on wet rails. There have been differential mechanisms proposed in which the differential becomes locked when one wheel absorbs the entire driving torque, with the result that the driving torque is then applied without any equalizing effect, even if the conditions required an unequal rotation between the driven members.

In the present invention a hydraulic differential is embodied in the mechanical differential and operates to permit free operation of the mechanical differential to a limited extent as, for instance, twenty-five per cent, after this the differential effect ceases and the torque is distributed from the drive shaft to the pair of driven shafts in this ratio. This application applies without regard to speed and it is equally effective for both directions of running.

In the drawings, 11 is the frame of the vehicle truck provided with guides 12 for the bearings 13, one of which supports the axle 14 connected to the running wheel 15 and the other supports the axle 16 connected to the running wheel 17. The drive shaft 21 is located between the axles 14 and 16 and is mounted in bearing 22 and upon this shaft the planetary member 23 is keyed by the key 55. The housing 24 encloses the mechanism and is filled with oil as indicated at 26, this housing has a sleeve at 25 which is mounted on the bearing 22. The bevel gear 27 is mounted on the upper end of the differential 23 and the corresponding bevel gear 28 is mounted on the lower end of 23. The planetary member is provided with one or more stems 30, 30′ upon which the bevel gears 29 and 29′ are mounted and are held in place by the plates 31 and 31′. These bevel gears engage the inner row of teeth 53 of bevel gear 27 and the inner row of teeth 53′ of bevel gear 28, thus providing a construction corresponding to the usual type of mechanical differential.

The outer teeth 54 of the bevel gear 27 engages gear 32 which is connected with the propeller shaft 33 through the universal couplings 34 and 35. The outer bevel teeth 54' of gear 28 engages gear 36 which is connected with the propeller shaft 37 through the flexible couplings 38 and 39. The shaft 37 drives the worm 51 in the housing 52 which is connected with the gear housing 46, mounted by flange 47 upon the axle housing 48, which is mounted on the sleeve 50 of the bearing 13 and is secured thereto by a non-turning engagement by means not shown in the drawings. The worm wheel 45 is keyed at 45a to the axle 14 and is driven by the worm 51 in the usual way. Collars 49 may be provided on the axle 14 to freely support the axle housing 48 which encloses these collars. The drive for axle 16 has the same structure as that described in connection with 14.

This mechanism provides an equalized drive for the propeller shafts 33 and 37 and permits of free spring action for the running wheels. The worm 51 and gear 45 may be formed as a spiral drive with any gear ratio desired. If necessary, the worm 45 may be substituted by the bevel gear 45a, Fig. 2a, with a bevel pinion 51a mounted on the propeller shaft 37.

The hydraulic differential

The bevel gear 27 is recessed to receive the eccentric 56 of a centrifugal compressor mounted on the end of the planetary member 23 and secured in place by the attaching ring 58b. The eccentric 56 is made with a concentric shoulder to receive the cover ring 58a which rotates on this shoulder and is secured to the gear 27. This encloses the circular space 57 in which the eccentric 56 works. Blades 59 and 60 are located in slots in the gear 27 and diametrically oppose each other. These blades are held in engagement with the eccentric 56 as it rotates by springs placed at the inner end of the blades as shown. This construction corresponds with a centrifugal compressor which is commercially made in a variety of forms.

The eccentric 56 is provided with a port at 61 opening into the oil chamber 26 of the gear housing and this port connects by passage 61a with the chamber 57 as the eccentric rotates. The opposite side of the eccentric is provided with a port 40 connected by passage 62 in the planetary member 23 with port 41 in the eccentric 56' of the opposite gear and to chamber 57 in this gear.

This mechanism is symmetrical about the transverse center and the longitudinal center. The gear 28 has a mechanism corresponding to gear 27 similarly referenced, the parts of the compressor being distinguished by a prime mark. The symmetrical construction makes the mechanism completely reversible.

It will be observed that in operation if liquid is compressed in the chamber 57 of gear 27 it will be forced through passage 62 into chamber 57 of gear 28 and if gear 28 is compressing liquid in chamber 57 and forcing it into passage 62 the liquid flow from both gears will be in opposition and a condition of equalization will be produced. If the speed of one of the gears is faster than the other gear, a greater quantity of liquid will be compressed into passage 62 by this gear which will tend to slow down the fast running gear and to increase the speed of the slow running gear until equalization results. This tends to neutralize the effect of the mechanical differential. In order that the mechanical differential may operate freely within predetermined limits, leak ports are provided in the eccentric 56 so that a percentage of the compressed fluid may escape through these ports up to the predetermined limit of the differential. When the differential effect exceeds this limit the excess pressure cannot escape through the limited leak ports and this pressure becomes effective to neutralize the differential effect.

The leak ports are indicated at 63 and connect by the passage 64 with the chamber 57. The size of these ports is adjustable by the plate 65 which may be rotated to cover part of the orifice 63 as desired. The leak ports 63 are preferably located in the eccentric 56 at right angles to the port 61 and the passage 40. In the compressor itself there may be a certain percentage of leakage which should be considered when adjusting the ports 63.

Figure 3:
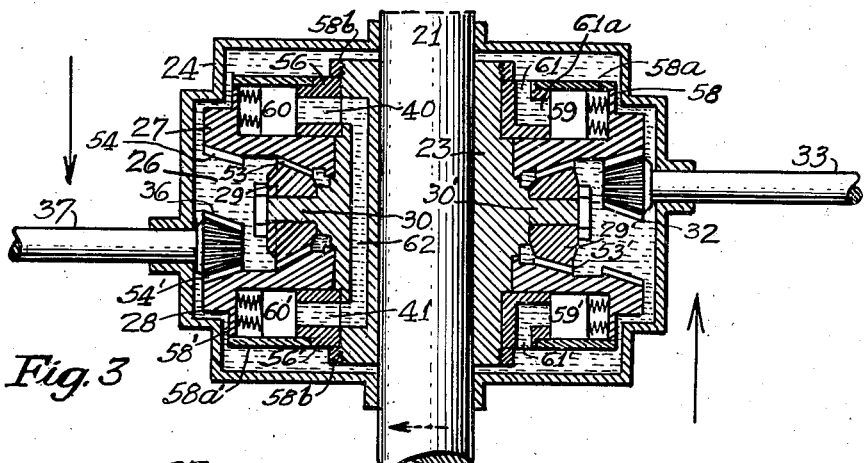
Fig. 3 is a horizontal section of the differential or equalized drive.
Figure 4:
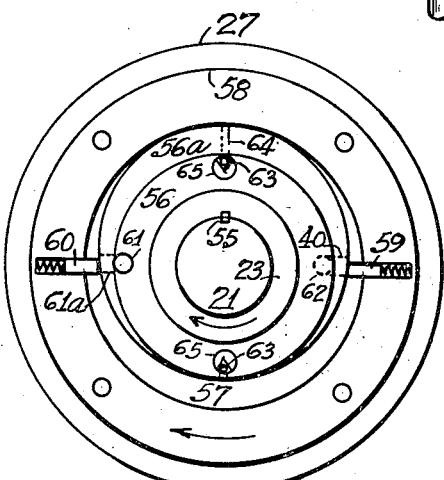
Fig. 4 is an end view looking from the top end of Fig. 3, with the cover removed.

Referring to Fig. 4 which is a view of gear 27 looking from the top and in which the drive shaft and the planetary member rotate in a clockwise direction, it will be noted that if the eccentric 56 rotates faster than gear 27 in the direction indicated by the arrow and with the intake ports 61 located at the leaving end of the cam, the fluid that has entered the space 57 through the port 61 enters passage 40 and passage 62 in the planetary member as the space 57 below the blade 59 is reduced. This condition is repeated for each half cycle of rotation of 56 relative to 27 which is determined by the blades 59 and 60.

Figure 5:
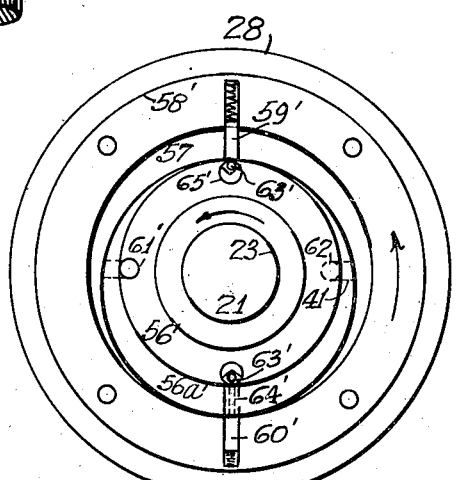
Fig. 5 is an end view looking from the bottom end of Fig. 3 with the cover removed.
Figure 6:
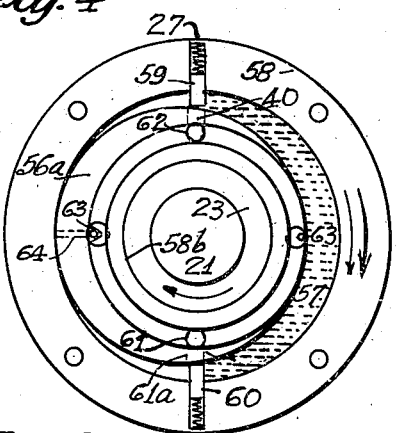
Fig. 6 shows the operation of the hydraulic mechanism at the top end.
Figure 7:
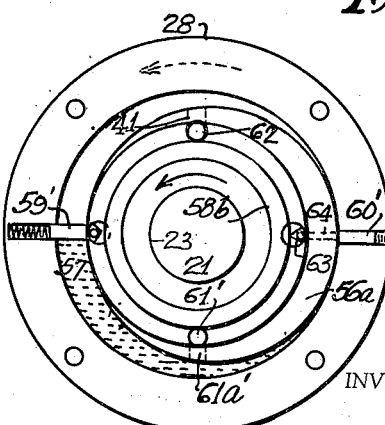
Fig. 7 shows the operation of the hydraulic mechanism from the bottom end.

Looking at the lower end of the mechanism and gear 28, Fig. 5, it will be noted that when the top end is rotating in a clockwise direction the rotation of the drive shaft at this end is counter-clockwise and liquid taken into the space 57 through the port 61' is forced by blade 59' through the port 41 and into passage 62 thereby opposing fluid from the opposite end as it is compressed into the passage 62. Figs. 6 and 7 show the eccentric 56 in different positions relative to the gears 27 and 28. The drawing indicates that oil has been taken into chamber 57 through port 61 in Fig. 6 and this oil will be forced through port 40 and passage 62 if the eccentric exceeds the speed of the gear 27. When this oil enters the space 57 in the gear 28 at the opposite end it can only expand by acting against blade 59' and rotating gear 28.

If, for instance, gear 28 is stalled and the planetary member is rotating this will force fluid under pressure into passage 62 above the blade 59' and this fluid will be opposed by fluid from the gear 27 at the opposite end if the speed of this gear does not exceed the speed of the planetary member. This construction operates as a differential mechanism by itself.

In the mechanical differential it will be noted that the gears 27 and 28 are driven in the same direction as the drive shaft and under normal conditions they drive at the same speed so that the differential effect remains inactive and the hydraulic differential is inactive. One of the important uses of this invention is its application to road vehicles where one wheel may lose its traction, in which case it is driven at twice the normal speed, while the other gear remains stationary. It will be observed from Figs. 4 to 7 that when the planetary member exceeds the speed of the gears the liquid is compressed into passage 62 to affect the other gear. On the other hand, when the gear exceeds the speed of the planetary member, such as occurs in the road vehicle above referred to, the liquid is not compressed in passage 62 by the high speed gear, but instead the eccentric associated with this gear becomes a pump. When the system is to be applied to conditions of this kind the ports in the eccentric at each end are reversely connected as indicated in Figs. 11 and 12. That is, the port 41, for instance, is connected by passages 62b and 62a to port 61a and the port 40 is connected by passages 62c and 62d with port 61a'.

In Fig. 8 a closed circuit system is provided by the passage 62 and passage 62' in 23 which connect the ports in 56 and 56' at each end. In the arrangement shown, if the gears 27 and 28 exceed the speed of the planetary member 23 oil will be delivered to the conduit 62' from both ends in opposite directions; the gears will thus oppose each other until they reduce to the speed of the planetary member. On the other hand, if the speed of the planetary member exceeds the speed of the gears, then oil is delivered to the conduit 62 in opposition from both ends until the speed of the gears is increased to equal the speed of the planetary member. It will be noted that with this arrangement if the gear 27, for instance, exceeds the speed of the planetary and the gear 28 is stopped, then gear 27 delivers oil to conduit 62' but the planetary member 23 is rotating at a higher speed than gear 28 so that a pump action is applied to conduit 62' in gear 28 which neutralizes the compressor action of 27. The same is true in the reverse order in conduit 62.

When the system is to be applied to a vehicle to limit the differential effect and where one wheel may be stalled and the other rotating at twice the normal speed the arrangement of ports in Figs. 10, 11 and 12 may be used. If it is assumed that gear 28 is stationary, that the planetary member and drive rotates at 1000 R. P. M., then gear 27 will rotate at 2000 R. P. M. or 1000 R. P. M. in excess of the speed of the planetary member which is indicated by the double arrows on gear 27. This moves the blades 59 and 60 relative to the eccentric 56 in the direction of the arrows and the compressed fluid in chamber 57 is forced through port 61a into the passage 62a, 62b, Fig. 12, to port 41 into the chamber 57 of gear 28 above the blade 59', and as the fluid can only expand by acting on blade 60' gear 28 is moved in the direction of the arrow, the excess speed of gear 27 is thus used to generate pressure for rotating gear 28 and this condition is maintained above the limit of the leakage ports. The result of the opposed forces transmitted through the liquid is to dampen the high speed of gear 27 and to increase the speed of gear 28 until the leakage passages 64 and 64' which connect across the eccentric 56, 56', as indicated at 64a, can by-pass the excess liquid compressed by the higher speed gear.

Suppose now that gear 27 is stationary and gear 28 is rotating at twice the speed of the planetary member 23 and in the same direction; this compresses liquid through port 61a into conduit 62d from gear 28, and through 62c to port 40 and chamber 57, in gear 27. The liquid can only expand in this chamber by engaging blade 60 and moving gear 27 in the direction of the arrows. This applies motion to 27 and correspondingly reduces the speed of 28 until the limit of the leakage ports is reached. This arrangement provides for one gear running faster than the planetary member and the other gear running slower than this member. This condition is assured by the construction of the mechanical differential.

In this invention a pump is associated with each of the balanced gears of the differential, the gear units with the pumps being similar. The difference in the rotation of the gear with reference to the planetary member operates the pump. The discharge from one pump is fed to the other pump to operate this pump as a motor, either by a conduit in the planetary member, or by a connection in some other part of the mechanism. The discharge from each pump operates against a yieldable member which transmits motion to limit the differential effect.

Oil pumps have been associated with differential mechanisms to lock the differential when there is an excessive difference in the drive. These pumps usually operate through a check valve or similar device, which valve when closed, stops the liquid flow and thus locks the differential. In these mechanisms a pair of pumps are not operating against each other and the discharge of the pump is not acting against a yieldable member.

The invention is shown applied to a railway truck but it is applicable to any kind of drive and to different types of differential gear.

Having thus described my invention, I claim:

1. A differential mechanism having a planetary member, a pair of opposed gears operatively connected with said planetary member, and means operated by the difference in rotation of one gear relative to said planetary member and a second similar and independent means operated by the difference in rotation of the other gear relative to the planetary member connected in opposition to the first means for limiting the differential operation of said gears.

2. A differential mechanism comprising a planetary member, a pair of opposed gears connected by said planetary member, an independent hydraulic pump operatively connected with each gear and a fluid connection between said pumps for limiting the rotation of one gear relative to the other.

3. A differential mechanism comprising a planetary member, a pair of opposed gears connected by said planetary member, a hydraulic pump for each gear independently connected with the planetary member, and a fluid connection for said pumps in said planetary member, said pumps being arranged to operate in opposition to each other.

4. A differential mechanism comprising a planetary member, a pair of opposed gears connected by said planetary member, and a hydraulic mechanism embodied in said differential mechanism, comprising a pair of pumps connected to oppose each other, operative when the drive is in either direction for retarding the differential effect after a predetermined differential is established.

5. A differential mechanism comprising a planetary member, a pair of opposed gears connected by said planetary member, and a pair of pumps operatively connected with said gears, a conduit in said planetary member connecting said pumps, said pumps being arranged to pump a fluid through said conduit in opposition when said gears are running at different speeds, to limit the extent of the differential effect, and a port of limited capacity for by-passing part of said fluid around the pumps.

6. A differential mechanism comprising a planetary member, a pair of opposed gears connected by said planetary member, a centrifugal compressor pump embodied in each gear, a conduit connecting said pumps, either of said pumps being arranged to pump liquid to the other pump when its gear exceeds the speed of the other gear and a limited by-pass for each pump.

7. A differential mechanism comprising a mechanical differential having a planetary member and a pair of opposed gears operatively connected by said planetary member, and a hydraulic differential comprising a pair of pumps connected to oppose each other operatively connected between said planetary member and said gears to modify the effect of the mechanical differential.

8. A differential mechanism having a planetary member and a pair of opposed gears, a cavity in each gear, a hydraulic compressor-pump in each cavity, operated by the difference in rotation between said planetary member and said gears and conduits in said planetary member connecting said compressor-pumps.

9. A differential mechanism having a planetary member and a pair of opposed gears operatively connected with the planetary member, a cavity in each gear, a hydraulic pump in each cavity, an intake port and a discharge port for each pump and conduits in said planetary member connecting said ports.

10. A differential mechanism having a planetary member and a pair of opposed gears operatively connected with the planetary member, a cavity formed between said planetary member and each gear, a centrifugal pump enclosed in each cavity with one member of the pump connected with the gear and the other member of the pump connected with the planetary member whereby the pumps are operated by the difference in rotation of the planetary member and the gears and means connecting said pumps to operate in opposition.

11. A differential mechanism having a planetary member with a sleeve and a pair of opposed gears operatively connected with the planetary member, a cavity formed between the planetary member and each gear, a centrifugal pump enclosed in each cavity, said pump having a blade operated by the gear and a rotor operated by the sleeve, whereby the pumps are operated by the difference in rotation of the planetary member and the gears and conduits in said sleeve connecting said pumps.

MATTHEW H. LOUGHRIDGE.